(12) United States Patent
Bonwick

(10) Patent No.: US 11,782,905 B1
(45) Date of Patent: Oct. 10, 2023

(54) METHOD AND SYSTEM FOR STREAMING DATA FROM PORTABLE STORAGE DEVICES

(71) Applicant: iodyne, LLC, Mill Valley, CA (US)

(72) Inventor: Jeffrey S. Bonwick, Los Altos, CA (US)

(73) Assignee: iodyne, LLC, Mill Valley, CA (US)

( * ) Notice: Subject to any disclaimer, the term of this patent is extended or adjusted under 35 U.S.C. 154(b) by 0 days.

(21) Appl. No.: 17/587,673

(22) Filed: Jan. 28, 2022

Related U.S. Application Data

(63) Continuation of application No. 17/396,878, filed on Aug. 9, 2021, now Pat. No. 11,537,597, which is a continuation of application No. 17/067,924, filed on Oct. 12, 2020, now Pat. No. 11,086,853.

(51) Int. Cl.
*G06F 16/23* (2019.01)
*G06F 16/2455* (2019.01)
(52) U.S. Cl.
CPC .... *G06F 16/2379* (2019.01); *G06F 16/24568* (2019.01)

(58) Field of Classification Search
CPC .................. G06F 16/2379; G06F 16/24568
See application file for complete search history.

(56) References Cited

U.S. PATENT DOCUMENTS

| 8,315,976 | B2 | 11/2012 | Multer et al. |
| 9,940,203 | B1 | 4/2018 | Ghatnekar et al. |
| 2007/0288533 | A1 | 12/2007 | Srivastava et al. |
| 2008/0282049 | A1* | 11/2008 | Kawamura ......... G06F 11/1471 |
| | | | 711/E12.103 |
| 2022/0206847 | A1* | 6/2022 | Mosto ..................... G06F 9/542 |

FOREIGN PATENT DOCUMENTS

JP          6793900 B2 * 12/2020  .............. G06F 11/07

* cited by examiner

*Primary Examiner* — Robert W Beausoliel, Jr.
*Assistant Examiner* — Mohammad S Bhuyan
(74) *Attorney, Agent, or Firm* — Smith & Woldesenbet Law Group, PLLC

(57) ABSTRACT

A method and system for streaming data from portable storage devices. Specifically, the disclosed method and system implement iterative data streaming from a portable storage device for remote storage operations, while requiring zero over-provisioning storage space for buffering incoming write operations to the portable storage device.

20 Claims, 6 Drawing Sheets

US 11,782,905 B1

METHOD AND SYSTEM FOR STREAMING DATA FROM PORTABLE STORAGE DEVICES

CROSS REFERENCE TO RELATED APPLICATIONS

This application is a continuation application of and claims priority under 35 U.S.C. § 120 to U.S. patent application Ser. No. 17/396,878, titled "Method and System For Streaming Data From Portable Storage Devices" and filed on Aug. 9, 2021, which claims priority under 35 U.S.C. § 120 to U.S. patent application Ser. No. 17/067,924, titled "Method and System For Streaming Data From Portable Storage Devices" and filed on Oct. 12, 2020 (now U.S. Pat. No. 11,086,853 issued on Aug. 10, 2021). The entire contents of these aforementioned applications are herein incorporated herein by reference.

BACKGROUND

Users of computing devices generate and locally store an ever increasing amount of data. In some scenarios, these users may also want to store another copy of the data in a different location. Traditional approaches to storing another copy of the data in a different location typically result in a decrease in performance of the computing device and/or a negative user experience while the data is being transferred.

SUMMARY

In general, in one aspect, the invention relates to a method for streaming data. The method includes receiving, from a host device, a delta generation request, in response to the delta generation request, identifying a first current transaction group identifier, obtaining a transaction group identifier associated with a last successful delta generation request, identifying a first collection of block sets mapped to a first collection of transaction group identifiers, wherein each transaction group identifier of the first collection of transaction group identifiers exceeds the transaction group identifier associated with the last successful delta generation request, and initiating, to the host device, a transmission of the first collection of block sets.

In general, in one aspect, the invention relates to a non-transitory computer readable medium (CRM). The non-transitory CRM includes computer readable program code, which when executed by a computer processor, enables the computer processor to receive, from a host device, a delta generation request, in response to the delta generation request, identify a first current transaction group identifier, obtain a transaction group identifier associated with a last successful delta generation request, identify a first collection of block sets mapped to a first collection of transaction group identifiers, wherein each transaction group identifier of the first collection of transaction group identifiers exceeds the transaction group identifier associated with the last successful delta generation request, and initiate, to the host device, a transmission of the first collection of block sets.

In general, in one aspect, the invention relates to a portable storage device. The portable storage device includes persistent storage, and a controller operatively connected to the persistent storage, and programmed to receive a delta generation request, in response to the delta generation request, identify a first current transaction group identifier, obtain a transaction group identifier associated with a last successful delta generation request, identify a first collection of block sets residing in the persistent storage and mapped to a first collection of transaction group identifiers, wherein each transaction group identifier of the first collection of transaction group identifiers exceeds the transaction group identifier associated with the last successful delta generation request, and initiate a transmission of the first collection of block sets.

Other aspects of the invention will be apparent from the following description and the appended claims.

DETAILED DESCRIPTION

Figure 1:
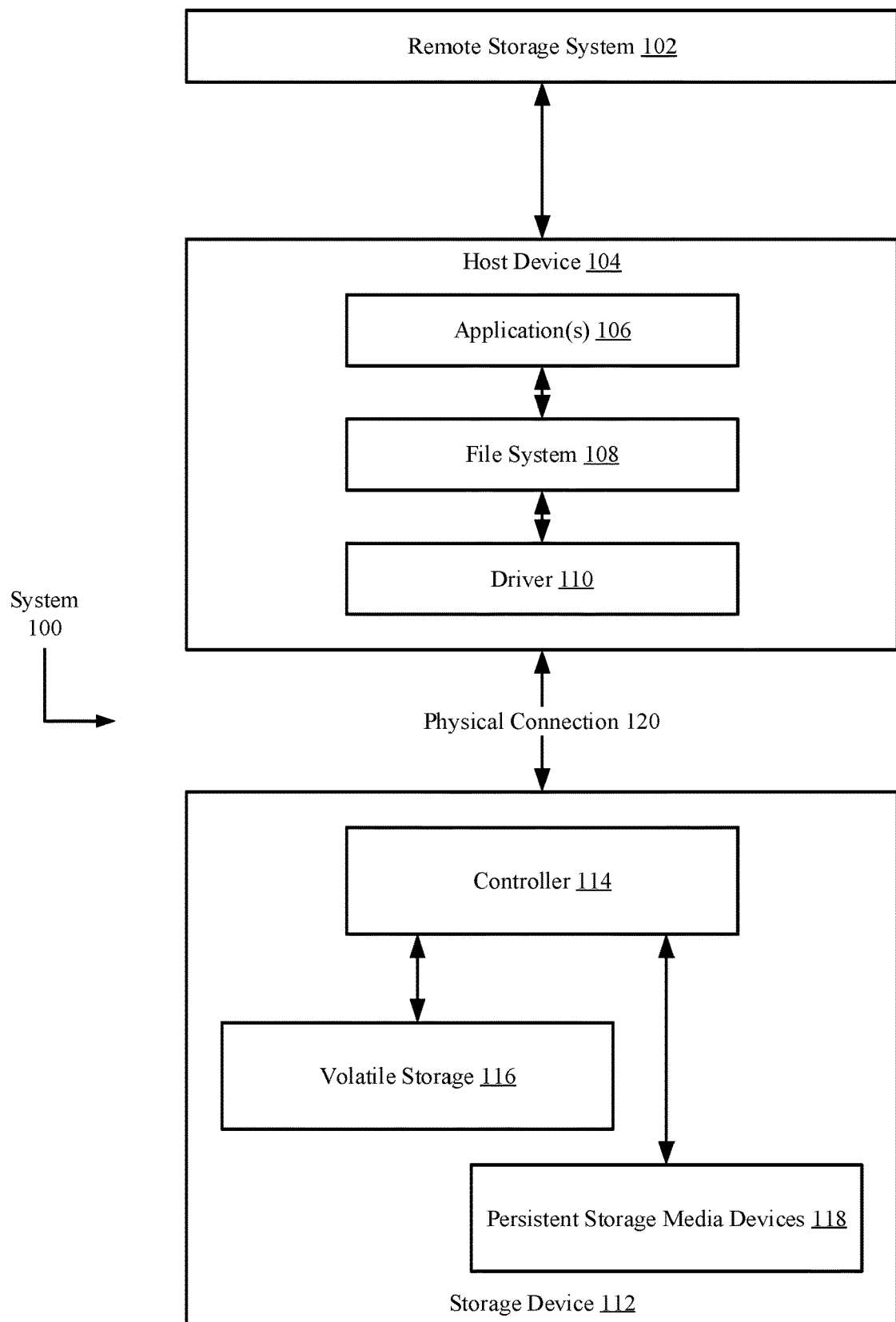
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for streaming data from portable storage devices. Specifically, one or more embodiments of the invention implement iterative data streaming from a portable storage device to a remote storage system, while requiring zero over-provisioning storage space for buffering incoming write operations to the portable storage device.

That is, conventionally, in order to store data changes that are atomically made in a portable storage device to a remote storage system, the portable storage device is required to cease any incoming write operations transpiring during a period of time during which the data changes are stored on the remote storage device. Often times, to mitigate the loss of write-data requested to be written into the portable storage device, which may result from the stoppage of any transpiring write operations, the portable storage device may be configured with a limited, over-provisioned storage space used to buffer the incoming write-data until the storage of aforementioned data changes to the remote storage system completes. There are scenarios, however, when an such remote storage operation may take longer to complete than the time that the portable storage device uses to consume the limited, over-provisioned storage space with buffered incoming write-data. In such scenarios, loss of write-data submitted to the portable storage device, after full-consumption of the limited, over-provisioned storage space, is inevitable.

FIG. 1 shows a system in accordance with one or more embodiments of the invention. The system (100) may include a remote storage system (102) operatively connected to a host device (104) through a network (not shown). In turn, the host device (104) may operatively connect to a storage device (112) through a physical connection (120). Each of these system (100) components is described below.

In one embodiment of the invention, the remote storage system (102) may represent a data backup, archiving, and/or disaster recovery storage system. The remote storage system (102) may be implemented using one or more servers (not shown)—each including, but not limited to, one or more arrays of persistent storage. Further, each server may represent a physical server, which may reside in a datacenter, or a virtual server, which may reside in a cloud computing environment. Additionally or alternatively, the remote storage system (102) may be implemented using one or more computing systems similar to the exemplary computing system shown in FIG. 6.

In one embodiment of the invention, the network (not shown) (e.g., a local area network (LAN), a wide area network (WAN) such as the Internet, a mobile network, any other network type, or a combination thereof), operatively connecting the remote storage system (102) and the host device (104), may be implemented using any combination of wired and/or wireless connections. The network may encompass various interconnected, network-enabled devices (e.g., switches, routers, gateways, etc.) that may facilitate communications between the remote storage system (102) and the host device (104). Further, the remote storage system (102) and the host device (104) may communicate with one another using any combination of wired and/or wireless communication protocols.

In one embodiment of the invention, the host device (104) may represent any physical appliance or computing system configured to receive, generate, process, store, and/or send data. Examples of the host device (104) may include, but are not limited to, a desktop computer, a tablet computer, a laptop computer, or any computing system similar to the exemplary computing system shown in FIG. 6. Furthermore, the host device (104) may include one or more applications (106), at least one file system (108), and at least one driver (110). Each of these host device (104) subcomponents is described below.

In one embodiment of the invention, an application (106) may refer to a computer program that may execute on the underlying hardware of the host device (104). Generally, an application (106) may be configured to perform one or more functions, tasks, and/or activities instantiated by a user of the host device (104). Further, towards performing these operations, an application (106) may include functionality to request and consume host device (104) resources (not shown) (e.g., computer processors, memory, storage, virtualization, network bandwidth, etc.) by way of service calls to the host device (104) operating system (OS) or kernel (not shown). An application (106) may also include functionality to request and consume resources, via service calls to the host device (104) OS or kernel, from external devices such as the storage device (112) and the remote storage system (102), which may operatively connect to the host device (104). One of ordinary skill will appreciate that an application (106) may perform other functionalities without departing from the scope of the invention. Examples of an application (106) may include, but are not limited to, a word processor, a multimedia creation program, a multimedia editing program, an email client, a database client, a web browser, a file viewer, an image editor, a simulator, a computer game, or another computer executable program.

In one embodiment of the invention, an application (106) may utilize service calls to read and/or write information from/to persistent (i.e., non-volatile) storage on the host device (104), the storage device (112), and/or the remote storage system (102). To enable these service calls, the host device (104) OS or kernel may implement and expose one or more file systems (108) to a user and, accordingly, to any application (104). Each file system (106) may represent one or more data objects or structures that collectively index and track various forms of a given subset of information stored on the host device (104), the storage device (112), and/or the remote storage system (102). By way of an example, a file system (108) may be implemented through at least a directory and an inode table, which may map filenames to disk blocks or cells in the physical storage on which the binary data corresponding to the filenames may reside. The invention is not limited to the aforementioned example.

In one embodiment of the invention, a file system (108) may interact with one or more drivers (110) to retrieve and/or store data from/into persistent storage on the host device (104), the storage device (112), and/or the remote storage system (102). A driver (110) for a given hardware device may refer to a special computer program that enables the operation or control of the given hardware device. More specifically, a driver (110) may serve as a translator between the instructing software (e.g., host device OS, file system (106), etc.) and the given hardware device, thereby facilitating the translation of the former's instructions into a language that the given hardware device can comprehend and act upon.

In one embodiment of the invention, the storage device (112) may relate to any portable, direct-attached storage (DAS) system. A DAS system may represent dedicated digital storage, which directly connects to a computing system—i.e., the host device (104)— rather than through a network (e.g., to the remote storage system (102)). The storage device (112) may be implemented, for example, as an enclosure including one or many non-transitory computer readable media for retaining digital data in whole or in part, and temporarily and/or permanently. Should the storage device (112) include multiple non-transitory computer readable media (e.g., flash storage, optical storage, magnetic storage, solid-state storage, etc.), the media may be of a common type or of varying types. Furthermore, the storage device (112) may include a controller (114), volatile storage (116), and one or more persistent storage media devices (118). Each of these storage device (112) subcomponents is described below.

In one embodiment of the invention, the controller (114) may represent an integrated circuit configured for processing instructions (e.g., computer readable program code). These instructions may include, but are not limited to, data reading and/or writing operations from the host device (104) directed to retrieving and/or storing information from/into the array of persistent storage media devices (118). Further, based on these instructions, the controller (114) may include functionality to interact with the volatile storage (116) and/or the array of persistent storage media devices (118) to perform the steps outlined in FIGS. 3 and 4, below. One of ordinary skill will appreciate that the controller (114) may perform other functionalities without departing from the scope of the invention. Examples of the controller (114) may include, but are not limited to, a micro-controller, a microprocessor, a field-programmable gate array (FPGA), a central processing unit (CPU), or any other instructions-processing integrated circuit.

In one embodiment of the invention, the volatile storage (116) may represent computer memory that requires power to maintain stored information. That is, volatile storage (116) may refer to storage technology capable of retaining information temporarily. Examples of volatile storage (116) may include, but are not limited to, static random access memory (SRAM) and dynamic random access memory (DRAM).

In one embodiment of the invention, the persistent storage media device(s) (118) may refer to a collection of non-volatile storage, or storage technologies that do not require a continuous supply of power to retain information. Accordingly, each persistent storage media device (118) may encompass non-transitory computer readable media on which digital information may be stored in whole or in part, and temporarily and/or permanently. Further, any subset or all of the persistent storage media device(s) (118) may or may not be combined in a redundant array of independent disks (RAID) configuration for fault tolerance purposes. Examples of persistent (i.e., non-volatile) storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the physical connection (120) between the host device (104) and the storage device (112) may represent any tangible cable, or an assembly of wires, configured for inter-device data transfer. Examples of the physical connection (120) may include, but are not limited to, a FireWire cable (which is based on IEEE 1394), a serial advanced technology attachment (SATA) (or any variant thereof) cable, a universal serial bus (USB) (or any variant thereof) cable, a small computer system interface (SCSI) (or any variant thereof) cable, a serial-attached SCSI (SAS) (or any variant thereof) cable, a Thunderbolt cable, or any other cabling solution for storage device (112) interfacing.

While FIG. 1 shows a configuration of components, other system (100) configurations may be used without departing from the scope of the invention.

Figure 2:
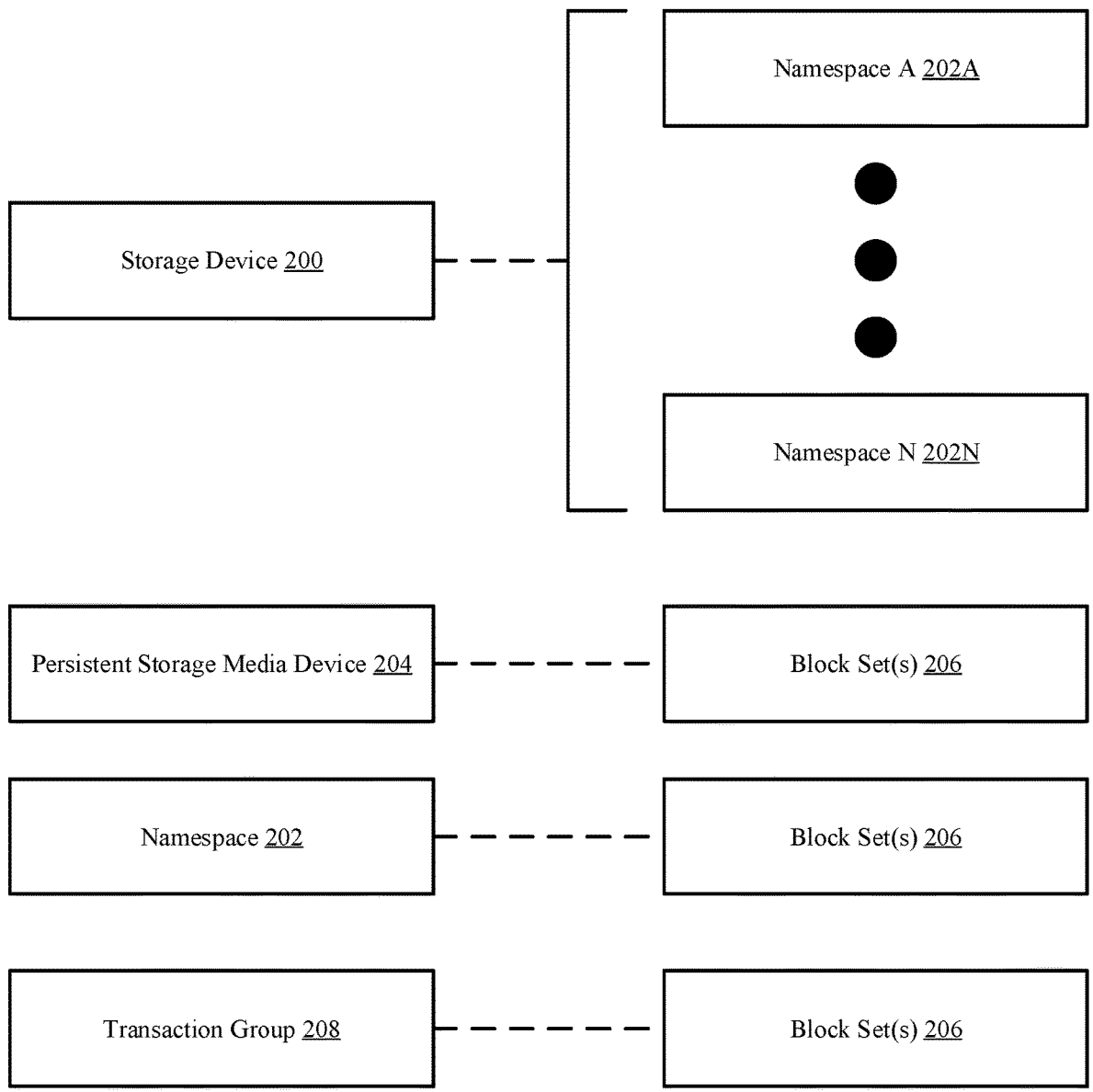
FIG. 2 shows various relationships in accordance with one or more embodiments of the invention.

FIG. 2 shows various relationships in accordance with one or more embodiments of the invention. These relationships may include mappings associating a storage device (200) to one or more namespaces (202, 202A-202N), a persistent storage media device (204) to one or more block sets (206), a namespace (202, 202A-202N) to the block set(s) (206), and a transaction group (208) to a block set (206). Each of these mappings is described below.

In one embodiment of the invention, a storage device (200) may retain digital data on one or many non-transitory computer readable media disposed therein, where the digital data may pertain to one or more namespaces (202, 202A-202N). A namespace (202, 202A-202N) may refer to an abstraction used to isolate a subset or partition of the pooled storage space, across the non-transitory computer readable media, which may be dedicated to a given user of a host device (not shown) (described above) (see e.g., FIG. 1), a given operating system (OS) installed on the host device, or a given file system implemented on the host device.

Further, in one embodiment of the invention, each namespace (202, 202A-202N) may define a hierarchical naming and organizational framework for managing data retained within the given subset of the pooled storage space with which the namespace (202, 202A-202N) may be associated. By way of an example, each namespace (202, 202A-202N) may define: (i) the character set (e.g., letters, numbers, symbols, etc.) and maximum length of characters used for data naming; (ii) the logical structure (e.g., directories, sub-directories, and filenames) used for data organization; and (iii) the metadata structure (e.g., disk block usage and availability, creation date, last modification date, disk block locations, disk subdivisions used, etc.) used for data description and support. Moreover, each namespace (202, 202A-202N) may be referenced using a unique namespace identifier.

In one embodiment of the invention, a persistent storage media device (204), of the storage device (200) (described above) (see e.g., FIG. 1), may represent a physical (i.e., hardware) disk for storing data. Further, the storage space on a physical disk may be subdivided into numerous data blocks—each of which may function as a smallest unit of storage space configured to be addressed and accessed by the storage device controller. A group of these data blocks, which may or may not be contiguous, across one or many physical disks, may be referred to as a block set (206).

In one embodiment of the invention, namespaces (202, 202A-202N), as described above, may isolate partitions of the pooled storage space, across the one or many persistent storage media device(s) (204), for dedicated use by given users, operating systems, and/or file systems. Each partition, accordingly, may utilize various non-contiguous data blocks, addressed and accessed in the form of one or more block sets (206) (described above), for storing data respective to their associated namespace (202, 202A-202N).

In one embodiment of the invention, a transaction group (208) may reference a changed data stream, or a sequence of block sets (206) of which each may include any granularity of change amongst their constituent group of data blocks. Changes to any data block may, for example, result from updates to or overwriting of existing data stored in a data block occupied by live data (i.e., a live cell); or from writing data into an available data block unoccupied by live data. Further, each transaction group (208) may be identified through a unique transaction group identifier.

In one embodiment of the invention, transaction group identifiers may be expressed as positive integers, which may be generated in successive, ascending order—e.g., 1, 2, 3, 4, ..., N. The generation of each successive transaction group identifier may be triggered by any configurable criterion. For example, each successive transaction group identifier may be generated following the elapsing of a configurable time interval $\Delta T$— i.e., at time T0, the transaction group identifier may be 1; at time T0+$\Delta T$, the transaction group identifier may be 2; at time T0+2·$\Delta T$, the transaction group identifier may be 3; and so forth. By way of another example, each successive transaction group identifier may be generated following a configurable threshold count C of block sets that have exhibited changes—i.e., a counter may be set to 1 and increments for each changed block set at the implementation time of the changes; eventually, a first collection of changed block sets [BS-1, BS-2, BS-3, ..., BS-C] is identified, where each changed block set may be tracked and enumerated by a successive counter value up until C is reached, where the first collection of changed block sets may each be mapped to transaction group identifier 1; the counter resets to 1 and increments again for each changed block set at the implementation time of the changes; eventually, a second collection of changed block sets [BS-1, BS-2, BS-3, ..., BS-C] is identified, where each changed block set may be tracked and enumerated by a successive counter value up until C is reached, where the second collection of changed block sets may each be mapped to transaction group identifier 2; and so forth. The invention is not limited to the aforementioned methods for generating transaction groups.

Figure 3:
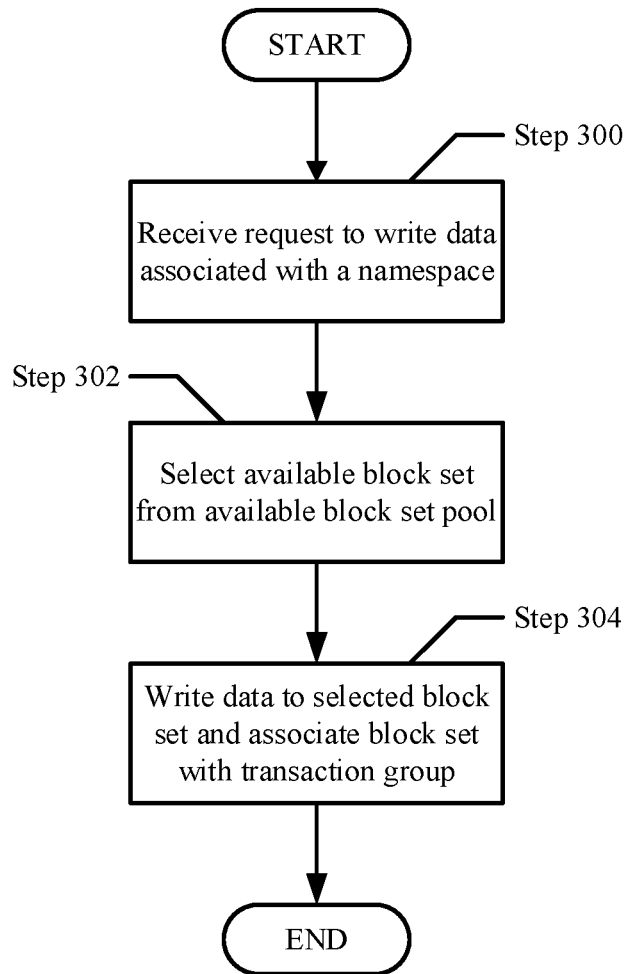
FIG. 3 shows a flowchart describing a method for writing data in accordance with one or more embodiments of the invention.

FIG. 3 shows a flowchart describing a method for writing data in accordance with one or more embodiments of the invention. The various steps outlined below may be performed by the controller of the storage device (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a write request is received from a host device (described above) (see e.g., FIG. 1). In one embodiment of the invention, the write request may include write-data, or any granularity of digital data requested to be written into persistent storage on the storage device, as well as a unique namespace identifier assigned to a given namespace.

In Step 302, one or more block sets is/are selected from amongst an available block set pool. In one embodiment of the invention, the available block set pool may refer to a collection of available block sets—each of which, including the selected block set(s), may represent a group of non-contiguous data blocks, across the persistent storage of the storage device, which may be available or unoccupied by live data. Live data, in turn, may refer to any granularity of digital data forming one or more active data files in whole or in part.

In Step 304, the write-data (obtained via the write request received in Step 300) is written into the block set(s) (selected in Step 302). Further, in one embodiment of the invention, the selected block set(s) may be associated with a given transaction group (described above) (see e.g., FIG. 2) designated for a given time interval or group of changed block sets, or more specifically, a unique transaction group identifier assigned to the given transaction group. The selected block set(s) may also be associated with the above-mentioned given namespace, or more specifically, the unique namespace identifier (further obtained via the write request received in Step 300) assigned to the given namespace.

Figure 4:
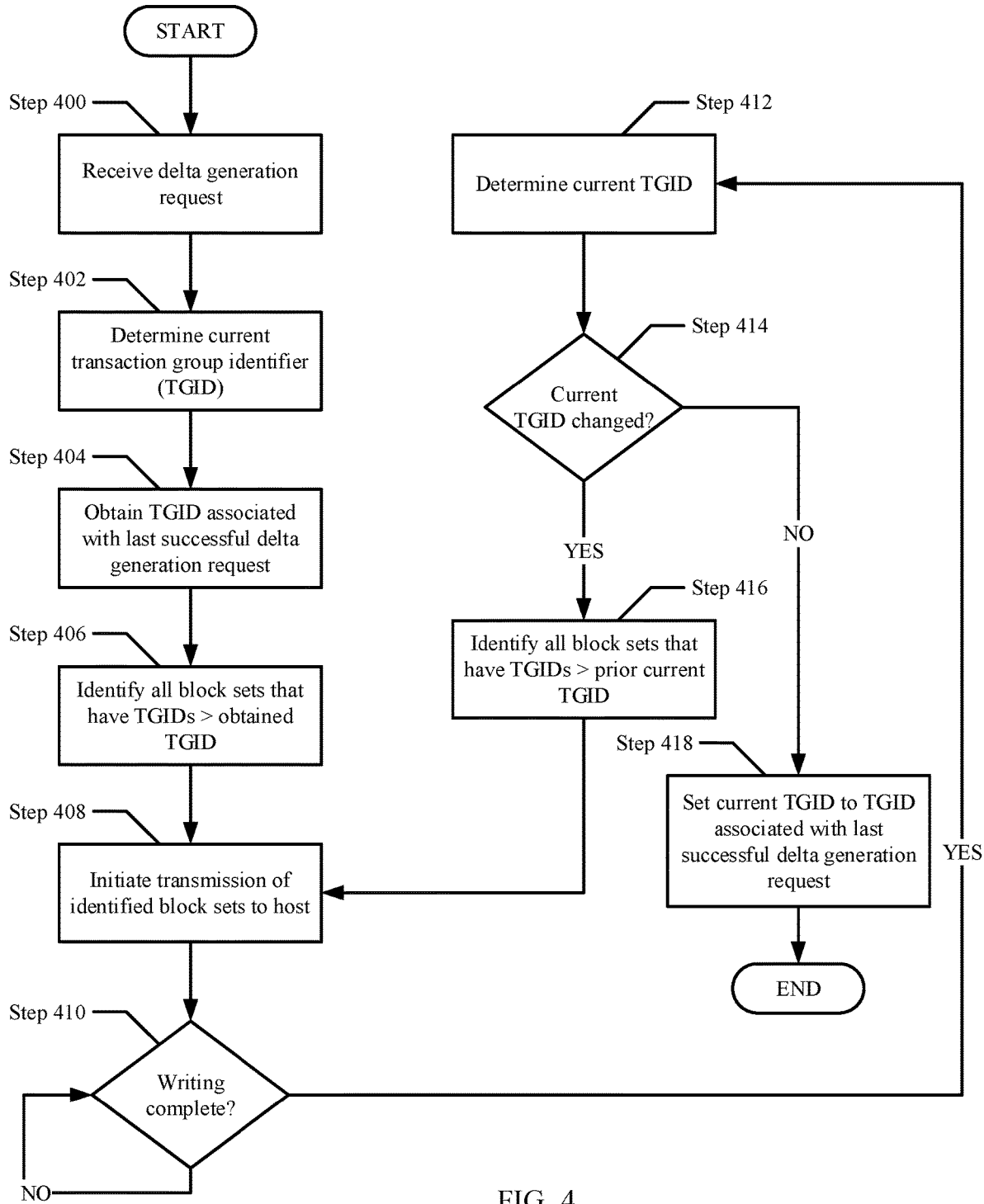
FIG. 4 shows a flowchart describing a method for streaming data from a portable storage device in accordance with one or more embodiments of the invention.

The method described above with respect to FIG. 3 may be performed in concurrently with one or more step in FIG. 4. As a result, the data may be stored in the storage device while the storage device is servicing a delta generation request. In this manner, the storage device may continue to service write requests while concurrently servicing delta generation requests.

FIG. 4 shows a flowchart describing a method for streaming data from a portable storage device in accordance with one or more embodiments of the invention. The various steps outlined below may be performed by the controller of the storage device (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a delta generation request is received from a host device (described above) (see e.g., FIG. 1). In one embodiment of the invention, the delta generation request may include a unique namespace identifier assigned to a given namespace.

In Step 402, a first current transaction group identifier is determined. In one embodiment of the invention, the first current transaction group identifier may refer to a most recently generated transaction group identifier, at the execution time of Step 402, based on a configured criterion governing transaction group identifier generation (see e.g., FIG. 2).

In Step 404, a transaction group identifier, associated with a last successful delta generation request, is obtained. In one embodiment of the invention, the transaction group identifier may refer to a transaction group identifier in existence at the point-in-time during which a last received delta generation request had been marked as successful (see e.g., Step 418).

In Step 406, a first collection of block sets is identified. In one embodiment of the invention, each block set of the first collection of block sets may be associated with the unique namespace identifier (obtained via the delta generation request received in Step 400). Further, each block set of the first collection of block sets may map to a transaction group identifier that exceeds (or is greater than) the transaction group identifier associated with the last successful delta generation request (obtained in Step 404). The first collection of block sets may encompass one or more transaction groups.

In Step 408, transmission of the first collection of block sets, to the host device, is initiated. Transmission of the first collection of block sets includes sending the blocks in the first collection of block sets to the host device and, upon receipt, the host device (e.g., via a network interface) sends the blocked to the remote storage system.

In Step 410, a determination is made as to whether the transmission (initiated in Step 408) has completed. The transmission is determined to be completed when the all blocks in the first collection of block sets are stored in the remote storage system. In one embodiment of the invention, if it is determined that the aforementioned transmission is complete, then the process proceeds to Step 412. On the other hand, in another embodiment of the invention, if it is alternatively determined that the aforementioned transmission is incomplete, then the process alternatively continues the transmission to the host device.

In Step 412, following the completion of the transmission of the first collection of block sets (determined in Step 410), a second current transaction group identifier is determined. In one embodiment of the invention, the second current transaction group identifier may refer to a most recently generated transaction group identifier, at the execution time of Step 412, based on a configured criterion governing transaction group identifier generation (see e.g., FIG. 2).

In Step 414, a determination is made as to whether the most recent current (e.g., a second determined in a first execution of Step 412, a third determined in a second execution of Step 412, etc.) transaction group identifier differs from the previous current (e.g., a first determined in Step 402, a second determined in the first execution of Step 412, etc.) transaction group identifier. Accordingly, in one embodiment of the invention, if it is determined that the most recent and previous current transaction group identifiers mismatch, then the process proceeds to Step 416. On the other hand, in another embodiment of the invention, if it is alternatively determined that the most recent and previous current transaction group identifiers match, then the process alternatively proceeds to Step 418.

In Step 416, following the determination (in Step 414) that the most recent current (e.g., a second determined in a first execution of Step 412, a third determined in a second execution of Step 412, etc.) transaction group identifier mismatches the previous current (e.g., a first determined in Step 402, a second determined in the first execution of Step 412, etc.) transaction group identifier, a second (i.e., or third, fourth, etc. dependent on the iteration) collection of block sets is identified. In one embodiment of the invention, each block set of the second, etc. collection of block sets may be associated with the unique namespace identifier (obtained via the delta generation request received in Step 400). Further, each block set of the second, etc. collection of block sets may map to a transaction group identifier that exceeds (or is greater than) the first (i.e., or second, third, etc. dependent on the iteration) current transaction group identifier. The second, etc. collection of block sets may encompass one or more transaction groups.

In one embodiment of the invention, for clarification of the above-mentioned iterations, following the identification of the second collection of block sets (in a first execution or iteration of Step 416), the process proceeds to a second execution/iteration of Step 408, where a transmission of the second collection of block sets, to the host device, is initiated. Further, upon completion of the aforementioned transmission, the process proceeds to a second execution/iteration of Step 412, where a third current transaction group identifier is determined and is used, in conjunction with the second current transaction group identifier (determined in the first execution/iteration of Step 412), to enact a second execution/iteration of either Step 416 or Step 418. The path of steps, from Step 416 to Step 408 to Step 410 to Step 412 to Step 416 again, may cycle for one or more iterations until a most recent current (e.g., second, third, etc.) transaction group identifier matches a previous current (e.g., first, second, etc.) transaction group identifier.

In Step 418, following the alternative determination (in Step 414) that the most recent current (e.g., a second determined in a first execution of Step 412, a third determined in a second execution of Step 412, etc.) transaction group identifier matches the previous current (e.g., a first determined in Step 402, a second determined in the first execution of Step 412, etc.) transaction group identifier, the write request (received in Step 500) is marked as a successful delta generation request and, accordingly, replaces the previous last successful delta generation request as the most recent last successful delta generation request.

In one embodiment of the invention, the method shown in FIG. 4 continues until the transaction group identifier does not change between the step 408 and step 414. However, if the amount of data being written (in accordance with FIG. 3) is at a rate that results in the transaction group identifier continually changing over successive iterations between the times Step 408 and Step 414 are performed, then the processing of the default generation request may be halted (or otherwise terminated) and the host device and/or the user of the host device may be informed that the delta generation request has failed. In such scenarios, the user and/or host device may attempt to perform the method shown in FIG. 4 at a latter point in time. For example, if Step 414 is performed more than four times (retry threshold) during the servicing of a single delta generation request, then method shown in FIG. 4 may be halted (or otherwise terminated). The retry threshold is not limited to the aforementioned example.

In one embodiment of the invention, if the delta generation request is halted, then the controller and/or the host device (or process executing thereon) may monitor the rate at which write requests are being issued to the storage device (also referred to as the write rate) and, when the write rate is below a pre-determined value (also referred to as the write rate threshold), the method shown in FIG. 4 may be automatically initiated. The automatic initiation may occur after a prior attempt to perform the method shown in FIG. 4 is halted (or terminated).

Additionally, or alternatively, the storage device may be configured to monitor the write rate and then automatically initiate (or prompt a user of the host device to initiate) the method shown in FIG. 4 when the write rate is below a write rate threshold. Other factors (in addition to the write rate and write rate threshold) may be used to automatically initiate the method shown in FIG. 4 without departing from the invention.

By implementing the method shown in FIGS. 3 and 4, various embodiments of the invention enable the storage of a copy of the data that is currently stored on the storage device in a remote storage device. However, the methods shown in FIGS. 3 and 4 can only guarantee that a copy of the data will, at some point in the future (assuming the method in FIG. 4 is not halted or terminated), be stored on the remote storage system; the methods shown in FIGS. 3 and 4 do not guarantee that a specific version of the data (i.e., data stored up to a specific transaction group) will be stored in the remote storage system.

Figure 5:
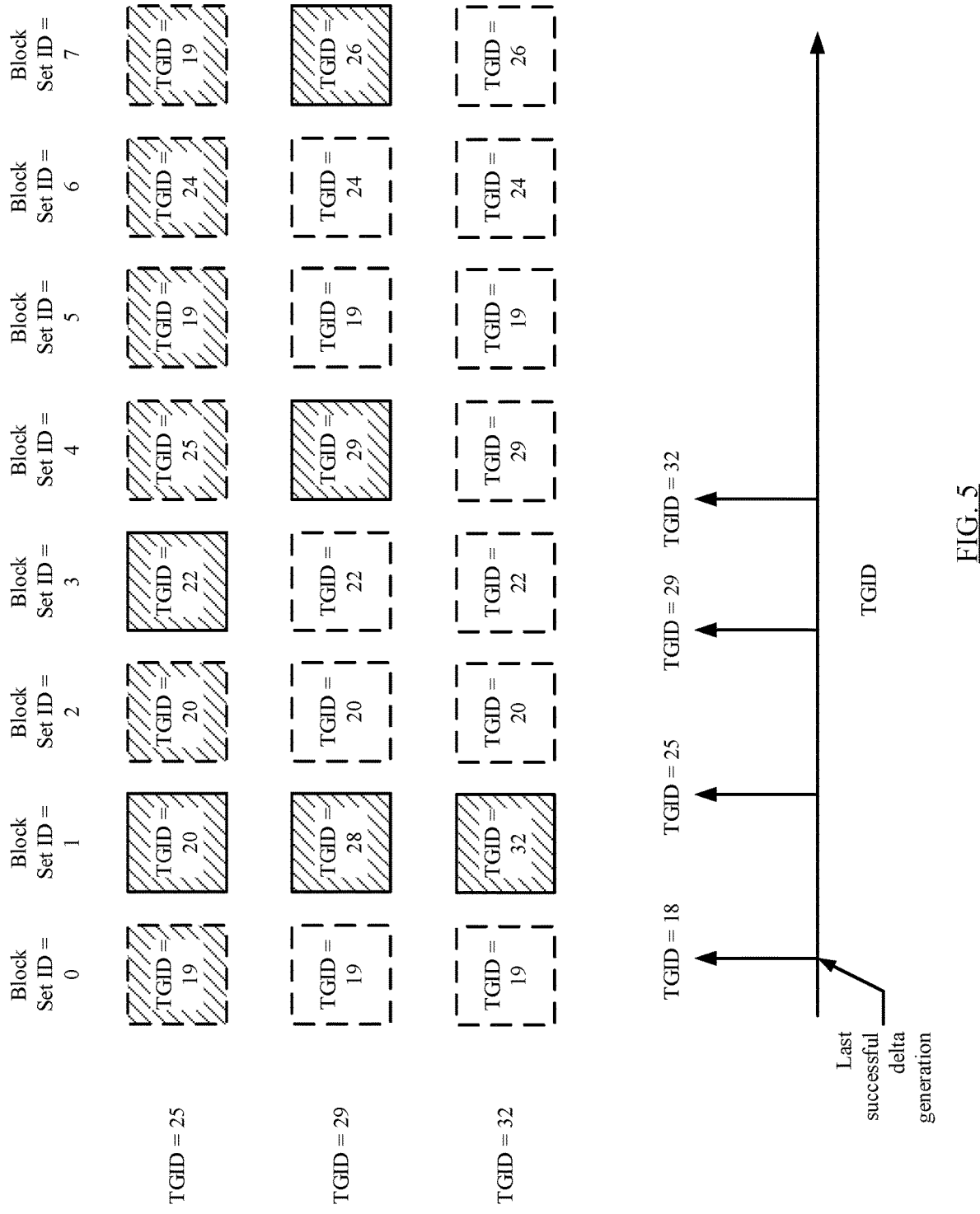
FIG. 5 shows an exemplary scenario in accordance with one or more embodiments of the invention.

FIG. 5 shows an exemplary scenario in accordance with one or more embodiments of the invention. The following exemplary scenario, presented in conjunction with components shown in FIG. 5, is for explanatory purposes only and not intended to limit the scope of the invention.

For the exemplary scenario, consider that a delta generation request has been received by a storage device (see e.g., FIG. 1) and from a host device physically connected thereto. The delta generation request may specify a unique namespace identifier assigned to the given namespace.

Turning to FIG. 5, following embodiments of the invention, processing of the delta generation request begins with a determination of a first current transaction group identifier—i.e., TGID 25. Next, a transaction group identifier—i.e., TGID 18— is obtained, which is associated with a last successful delta generation request. Thereafter, a first collection of block sets, mapped to the given namespace, is identified. The first collection of blocks sets include block set 0 (BS-0), BS-1, BS-2, BS-3, BS-4, BS-5, BS-6, and BS-7. Further, each block set of the first collection of block sets is identified based on their respective transaction group identifier at the time (i.e., TGID 19 for BS-0, TGID 20 for BS-1, TGID 20 for BS-2, TGID 22 for BS-3, TGID 25 for BS-4, TGID 19 for BS-5, TGID 24 for BS-6, and TGID 19 for BS-7) exceeding the transaction group identifier (i.e., TGID 18) for the last successful delta generation request. Through their identification, each block set of the first collection of block sets includes at least one constituent data block exhibiting a state (e.g., available or occupied), or storing data (e.g., updated or overwritten), different from their respective state or stored data during processing of the last successful delta generation request.

Following their identification, transmission of the first collection of block sets, to the host device, initiates. Upon the completion of this transmission, a second current transaction group identifier—i.e., TGID 29— is determined. Because the second current transaction group identifier mismatches the first current transaction group identifier (i.e., TGID 25), a second collection of block sets, mapped to the given namespace, is identified. The second collection of block sets include BS-1, BS-4, and BS-7, each of which is identified based on their respective transaction group identifier at the time (i.e., TGID 28 for BS-1, TGID 29 for BS-4, and TGID 26 for BS-7) exceeding the first current transaction group identifier. Through their identification, each block set of the second collection of block sets includes at least one constituent data block exhibiting a change of state or a change of data stored therein since the identification of the first collection of block sets.

Following their identification, transmission of the second collection of block sets, to the host device, initiates. Upon completion of this transmission, a third current transaction group identifier—i.e., TGID 32— is determined. Because the third current transaction group identifier mismatches the second current transaction group identifier (i.e., TGID 29), a third collection of block sets, mapped to the given namespace, is identified. The third collection of block sets include BS-1, which is identified based on their respective transaction group identifier at the time (i.e., TGID 32) exceeding the second current transaction group identifier. Through their identification, BS-1 of the third collection of block sets includes at least one constituent data block exhibiting a change of state or a change of data stored therein since the identification of the second collection of block sets.

Following their identification, transmission of the third collection of block sets—i.e., BS-1— to the host device, initiates. Upon completion of this transmission, a fourth current transaction group identifier—i.e., TGID 32— is determined. This time, because the fourth current transaction group identifier matches the third current transaction group identifier (i.e., TGID 32), the received delta generation request is marked as successful and replaces the previous last successful delta generation request as the most recent last successful delta generation request. Further, the most recent last successful delta generation request is associated with the fourth current transaction group identifier (i.e., TGID 32), which may be used in the processing of a future received delta generation request by the storage device.

Figure 6:
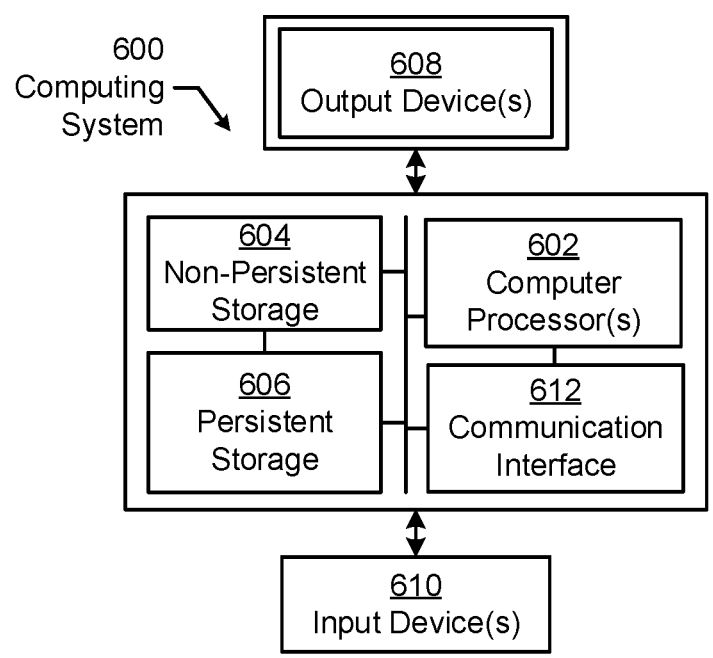
FIG. 6 shows an exemplary computing system in accordance with one or more embodiments of the invention.

FIG. 6 shows an exemplary computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for streaming data using a collection of block sets, the method comprising:
    initiating an iteration of a delta generation request upon receiving, from a host device at a current time, a request to identify an updated block set in the collection of block sets relative to a prior time preceding the request;
    identifying the updated block set;
    incrementing a count after identifying the updated block set;
    reporting the updated block set to the host device;
    ignoring, after successfully reporting the updated block set to the host device, a subsequent request from the host device to initiate a subsequent iteration when the count reaches a threshold count value; and initiating, after successfully reporting the updated block set to the host device, the subsequent iteration upon receiving the subsequent request from the host device when the count does not reach the threshold count value.

2. The method of claim 1, wherein the subsequent request is ignored for a period of time when the count reaches the threshold count value, and wherein the subsequent iteration is initiated after the period of time has lapsed.

3. The method of claim 1, wherein reporting the updated block set comprises providing a transaction group identifier of the updated block set.

4. The method of claim 1, further comprising:
pausing initiating the subsequent iteration for a period of time upon receiving the subsequent request from the host device when the count does not reach the threshold count value.

5. The method of claim 4, wherein the count reaches an interim threshold value count that is less than the threshold value count.

6. The method of claim 1, further comprising:
terminating the delta generation request when the count reaches the threshold value count.

7. The method of claim 6, further comprising:
informing the host device that the delta generation request has been terminated.

8. The method of claim 1, further comprising:
providing the host device access to contents of the updated block set.

9. A non-transitory computer readable medium (CRM) comprising computer readable program code, which when executed by a computer processor, enables the computer processor to:
initiate an iteration of a delta generation request upon receiving, from a host device at a current time, a request to identify an updated block set in the collection of block sets relative to a prior time preceding the request;
identify the updated block set;
increment a count after identifying the updated block set;
report the updated block set to the host device;
ignore, after successfully reporting the updated block set to the host device, a subsequent request from the host device to initiate a subsequent iteration when the count reaches a threshold count value; and
initiate, after successfully reporting the updated block set to the host device, the subsequent iteration upon receiving the subsequent request from the host device when the count does not reach the threshold count value.

10. The non-transitory CRM of claim 9, wherein the subsequent request is ignored for a period of time when the count reaches the threshold count value, and wherein the subsequent iteration is initiated after the period of time has lapsed.

11. The non-transitory CRM of claim 9, wherein reporting the updated block set comprises providing a transaction group identifier of the updated block set.

12. The non-transitory CRM of claim 9, wherein the computer readable program code further enables the computer processor to:
pause initiating the subsequent iteration for a period of time upon receiving the subsequent request from the host device when the count does not reach the threshold count value.

13. The non-transitory CRM of claim 12, wherein the count reaches an interim threshold value count that is less than the threshold value count.

14. The non-transitory CRM of claim 9, wherein the computer readable program code further enables the computer processor to:
terminate the delta generation request when the count reaches the threshold value count.

15. The non-transitory CRM of claim 14, wherein the computer readable program code, which when executed by the computer processor, further enables the computer processor to:
inform the host device that the delta generation request has been terminated.

16. The non-transitory CRM of claim 9, wherein the computer readable program code, which when executed by the computer processor, further enables the computer processor to:
provide the host device access to contents of the updated block set.

17. A portable storage device, comprising:
persistent storage; and
a controller operatively connected to the persistent storage, and programmed to:
initiate an iteration of a delta generation request upon receiving, from a host device at a current time, a request to identify an updated block set in a collection of block sets relative to a prior time preceding the request;
identify the updated block set;
increment a count after identifying the updated block set;
report the updated block set to the host device;
ignore, after successfully reporting the updated block set to the host device, a subsequent request from the host device to initiate a subsequent iteration when the count reaches a threshold count value; and
initiate, after successfully reporting the updated block set to the host device, the subsequent iteration upon receiving the subsequent request from the host device when the count does not reach the threshold count value.

18. The portable storage device of claim 17, wherein the portable storage device is a directly-attached storage (DAS) system.

19. The portable storage device of claim 18, further comprising:
a host device directly connected to the portable storage device,
wherein the delta generation request is received from the host device.

20. The portable storage device of claim 19, further comprising:
a remote storage system operatively connected to the host device, wherein contents of the updated block set are sent to the remote storage system for access by the host device.

\* \* \* \* \*